(No Model.)
D. S. MUNGER.
HORSE CHECKING DEVICE.
No. 387,176. Patented July 31, 1888.
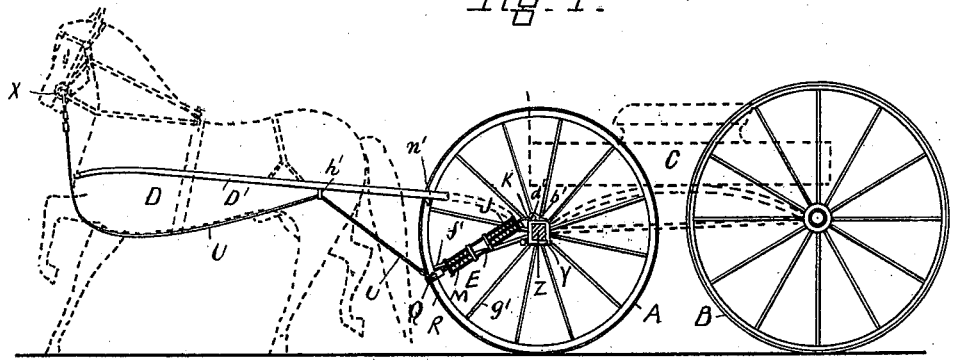
Fig. 1.
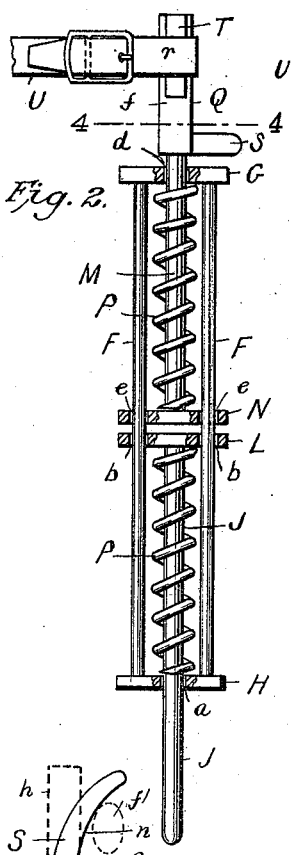
Fig. 2.
Fig. 4.
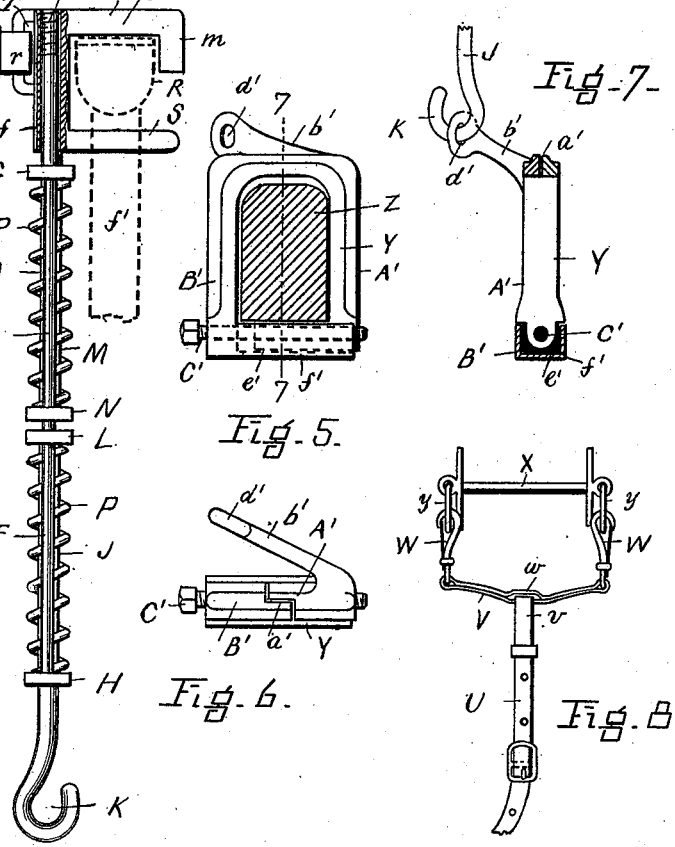
Fig. 3.
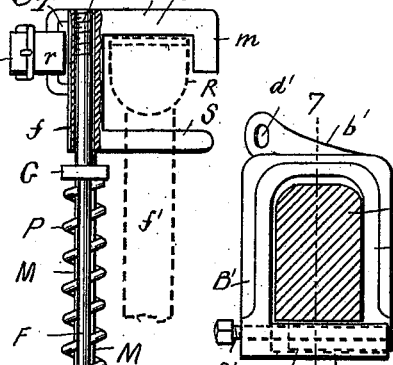
Fig. 5.
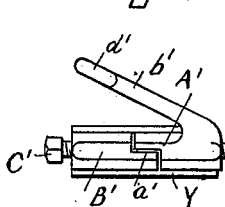
Fig. 6.
Fig. 7.
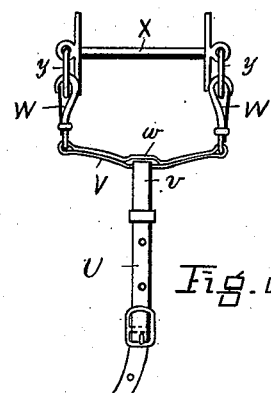
Fig. 8.
WITNESSES.
Percy Bryant.
C. E. Nichols.
INVENTOR.
Dexter S. Munger
per Edwin W. Brown.
Attorney.
N. PETERS, Photo-Lithographer, Washington, D. C.

UNITED STATES PATENT OFFICE.

DEXTER S. MUNGER, OF STONEHAM, MASSACHUSETTS, ASSIGNOR OF ONE-HALF TO CYRUS E. PRICE, OF SAME PLACE.

HORSE-CHECKING DEVICE.

SPECIFICATION forming part of Letters Patent No. 387,176, dated July 31, 1888.

Application filed December 22, 1887. Serial No. 258,735. (No model.)

*To all whom it may concern:*

Be it known that I, DEXTER S. MUNGER, of Stoneham, in the county of Middlesex and State of Massachusetts, have invented certain new and useful Improvements in Horse-Checking Devices, of which the following is a full, clear, and exact description.

This invention relates to improvements in a device for checking horses and preventing their running away when left to stand alone with the vehicle, shown in Letters Patent of the United States issued to me, dated May 5, 1885, No. 316,996; and the invention consists of a device constructed and arranged to be detachbly secured to the axle-tree and to the wheel of the vehicle, and provided with a strap or rein which is adapted to be secured to the bridle or bit of the horse or to the driving-reins, all substantially as hereinafter fully described, reference being had to the accompanying sheet of drawings, in which—

Figure 1 represents in side view the wheels and shaft of a buggy with the horse and buggy-body in dotted lines, showing this checking device and mode of application thereto. Figs. 2 and 3 are two side views of the horse-checking device at right angles to each other. Fig. 4 is a detail sectional view on line 4 4, Fig. 2. Fig. 5 is a cross-section of the axle-tree, showing in side view secured thereto means for attaching the checking device of Figs. 2 and 3 to the axle-tree. Fig. 6 is a plan view of this attaching device; Fig. 7, a vertical section on line 7 7, Fig. 5; and Fig. 8, a plan view of the checkrein as attached to the horse's bit.

In the drawings, A B represent, respectively, in side view the front and rear wheels of a buggy, the buggy C and horse D being in dotted lines, and having this improved horse-checking device E attached thereto. This device E is constructed as follows:

F F are two parallel straight bars or rods of wire connected at their upper and lower ends to cross-bars G H, respectively, to which they are riveted, or they can be secured in any suitable manner.

J is a bar or rod between the two bars F F and parallel therewith, extending through a socket or bearing, $a$, in the lower cross-bar, H, and adapted to slide back and forth therein, having a hook, K, on one end, and riveted or rigidly secured by its upper end to a cross-bar, L, having a socket, $b$, in each end, and adapted to slide back and forth over the two bars or rods F F.

M is another bar or rod between the two bars F F and parallel therewith, and extending and adapted to slide back and forth through a socket or bearing, $d$, in the upper cross-bar, G, and riveted or rigidly secured by its lower end to a cross-bar, N, having a socket, $e$, in each end, and adapted to slide back and forth over the two rods F F.

Each of the rods J M has a spiral spring, P, encircling it and adapted to bear against its respective bar L N and the cross-bars G H of the parallel rods F F, by which the two parts are held in their normal positions, (shown in Figs. 2 and 3,) and if pulled apart the springs P will by their tension return them to their normal position.

Q is a clasp or clip having a hole through its upright portion $f$, through which extends the end $g$ of the rod M, and riveted at its outer end, but so the clasp can freely swivel thereon. This clasp has a right-angular portion, $h$, and a return-bend, $m$, to receive the rim or tire R of a wheel, as shown in Fig. 3. It also has an arm, S, which projects laterally and is bent slightly, curving horizontally, as shown at $n$ in Fig. 4.

T is an eye of the clasp Q, to which the strap or rein U, of leather or suitable material, is attached by a loop, $r$, and buckle $t$, all as usual.

The other end, $u$, of this strap U is connected by a loop, $v$, to a loop, $w$, at the central portion of a short strap, V, substantially at right angles thereto, having at each end a spring snap or hook, W, by which the short strap is attached to each ring $y$ of the bit X, as shown in Fig. 8. The loop $w$ to the short strap secures the strap or rein U at its central portion, and preferably is a short loop to keep the connection between the two at such central portion, so as to always pull upon the bit squarely and evenly.

Y is a device by which the checking device E is attached to the axle-tree Z. It is formed of two U-shaped parts, A' B', placed together, as shown in Figs. 5 to 7, one part, A', adapted to slide within the other part, B', as shown in Fig. 7, and secured together by a screw, C', passing through one and screwing into the other. The upper end of each part is halved on its contiguous side, as at $a'$, Fig. 6, so as to lap over each other to prevent sidewise movement and keep the parts closely together. From one, A', extends in a direction forward and sidewise an arm, $b'$, having an eye, $d'$, to receive the hook K of the checking device E.

The fastening device Y is intended to be attached to the axle-tree all the time, and to secure it thereto the two parts are separated, the screw-bolt C' being removed, and are placed over the axle-tree Z near the wheel for its arm $b'$ to be uppermost and project forward, and then the screw-bolt C' is inserted and screwed up tightly, which brings the two parts together over and firmly secures them to the axle-tree.

In the use of this horse-checking device, the axle-tree fastening Y having been previously attached to the axle-tree, as described, the checking device E is attached thereto by its hook K in the eye $d'$ of the arm $b'$, and then the clasp Q is passed over the rim R of the wheel B, the two parts of the device E being pulled apart against their springs sufficiently for such, and when so placed the springs by their reaction will hold the same firmly on the wheel, and in such attachment the curved arm S of the clasp Q is placed between the two spokes $f'$ $g'$ of the wheel at the place where the device is applied. The checkrein U is run in or through the loop $h'$ on the shaft D', then under the fore leg, $m'$, of the horse, and the two spring-snaps W secured to the respective rings $y$ of the ends of the bridle or bit X, as shown in Fig. 8. When so attached, if the horse attempts to move forward, in such movement the wheel A will turn to the left, carrying with it the device, because the next spoke, $f'$, to the right or above the device will abut against its curved arm S, and as it moves forward and down into the position shown in Fig. 1 it pulls upon the rein U and draws it tightly, pulling upon the bit, thereby checking the horse, and the more he attempts to move forward or run the harder the rein U will pull upon the bit, which will thus serve to check and hold and prevent his further forward movement and consequent running away. If the horse should back, the wheel, turning in the reverse direction, raises the checking device and, loosening the check-rein, relieves the horse of strain upon his bridle or bit. Thus a horse by this simple device attached to the wheel will be made to stand still and be prevented from running away.

When this device is not in use, it can be hung to the shaft by placing its clasp Q on a hook, $n'$, on the shaft, where it will be in convenient position ready for use.

The checking device can be secured to the axle-tree in any suitable manner in lieu of the special device herein shown, as a simple hook or eye can be permanently secured to the axle-tree. The arm $b'$ of the attaching device extends sidewise, as shown, in order to have its eye $d'$, to which the checking device is secured, near to the wheel, for the checking device to be in a better position next to the wheel and not interfere with the shaft in use, although, if desired, such arm need not project in such direction, but can be straight and the hook rod or bar J be bent at its lower end to allow for such offset. It is preferable, however, to have it as described.

The rein U, in lieu of being long enough to be attached to the horse's bit, can be made shorter and have its free end adapted to have the driving-reins attached to the strap by any suitable clasp, by which, in the operation of the device, the driving-reins would be pulled, and thus check the horse.

The axle-tree-connecting device Y is made in two parts, so it can be easily and conveniently attached to and detached from the axle-tree, as desired, and when attached the tightening up of the screw-bolt securely fastens it thereto. The one part sliding with the other prevents sidewise movement.

Having thus described my invention, what I claim is—

1. The combination, with the axle-tree of a vehicle, of a check device formed of two parts adapted to slide from and toward each other on guiding-rods F F, and controlled by springs P, one part adapted to be secured to the axle-tree and the other part to be attached to the rim of the wheel, and provided with an arm, S, and a checkrein adapted to be secured to the bridle or bit of the horse or driving-reins, for the purpose specified.

2. The combination, with the axle-tree of the vehicle, of a check device formed of two parts adapted to slide from and toward each other on guiding-rods F F, and controlled by springs P, one part adapted to be secured to the axle-tree and the other part to be attached to the rim of the wheel, and provided with an arm, S, and a checkrein adapted to be secured to the middle portion of a short strap secured to the bridle or bit of the horse by its two ends.

3. A clasp or clip, Q, adapted to be attached and secured to a wheel made in one piece to partially surround the rim or tire of the wheel, and having a laterally-projecting arm, S, to engage with a spoke of the wheel, and connected to the axle-tree and to a checkrein adapted to be secured to the bridle or bit of the horse, for the purpose specified.

4. A fastening device adapted to be detachably secured to the axle-tree, consisting of the two parts A' B', one, A', provided with an offset arm, $b'$, having an eye, $d'$, and adapted to slide within the other part, B', and connected and secured together by a screw-bolt, for the purpose specified.

In testimony whereof I have hereunto set my hand in the presence of two subscribing witnesses.

DEXTER S. MUNGER.

Witnesses:
EDWIN W. BROWN,
PERCY BRYANT.